(12) United States Patent
Neumann (10) Patent No.: US 7,870,799 B2
(45) Date of Patent: Jan. 18, 2011

(54) METHOD AND APPARATUS FOR TESTING THE AIR FLOW IN A CLOTHES DRYER

(75) Inventor: Gregory John Neumann, Coloma, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 316 days.

(21) Appl. No.: 12/208,462

(22) Filed: Sep. 11, 2008

(65) Prior Publication Data

US 2010/0058611 A1   Mar. 11, 2010

(51) Int. Cl.
*D06F 58/28* (2006.01)
*G01N 19/00* (2006.01)
*F26B 19/00* (2006.01)

(52) U.S. Cl. .................... 73/865.9; 34/89; 116/202
(58) Field of Classification Search ........................ None
See application file for complete search history.

(56) References Cited

U.S. PATENT DOCUMENTS

| 3,639,998 A | 2/1972 | Mason |
| 3,718,982 A | 3/1973 | Deaton |
| 4,081,997 A * | 4/1978 | Losert .......................... 73/168 |
| 4,520,748 A | 6/1985 | Frano et al. |
| 5,809,828 A * | 9/1998 | Gardell et al. ............. 73/865.9 |
| 5,860,224 A | 1/1999 | Larson |
| 6,328,647 B1 * | 12/2001 | Traudt ......................... 454/255 |
| 6,694,683 B2 | 2/2004 | Anderson et al. |
| 6,725,732 B1 | 4/2004 | Stein |
| 6,971,186 B1 | 12/2005 | Chin et al. |
| 7,151,264 B2 * | 12/2006 | Ehlers, Sr. ................. 250/373 |
| 7,213,478 B2 * | 5/2007 | Harada et al. ............. 73/865.9 |
| 7,544,291 B2 * | 6/2009 | Ehlers, Sr. ................. 210/198.1 |

FOREIGN PATENT DOCUMENTS

| EP | 1568817 A1 | 8/2005 |
| WO | 2005/040483 A1 | 5/2005 |
| WO | 2007/049190 A1 | 5/2007 |

* cited by examiner

*Primary Examiner*—Harshad Patel
(74) *Attorney, Agent, or Firm*—Clifton G. Green; McGarry Bair PC (57) ABSTRACT

A method and apparatus for testing the air flow in a clothes dryer by determining a pressure characteristic of the air within the drying chamber when the dryer is turned on and comparing the determined pressure characteristic to a predetermined reference value to ascertain the condition of the air flow in the dryer.

20 Claims, 8 Drawing Sheets

METHOD AND APPARATUS FOR TESTING THE AIR FLOW IN A CLOTHES DRYER

BACKGROUND OF THE INVENTION

A clothes dryer is a common household device having a rotating drum into which the clothes are placed and an air flow system having a blower to first draw air across a heating element and into the drum, through a lint filter, and finally out through an exhaust conduit that is connected to an exhaust vent system leading out of the house. If either the air flow system or household exhaust vent system has a restriction that reduces air flow, it may lead to poor drying performance.

SUMMARY OF THE INVENTION

The invention relates to an apparatus and method for testing the air flow in a clothes dryer by inserting a portion of a pressure sensor probe into the drying chamber of the clothes dryer and closing the door on the probe, while leaving a portion of the pressure sensor probe exterior of the dryer, and determining a pressure characteristic of the air within the drying chamber when the dryer is turned on, and comparing the determined pressure characteristic to a predetermined reference value to ascertain the air flow in the dryer.

DESCRIPTION OF EMBODIMENTS OF THE INVENTION

Figure 1:
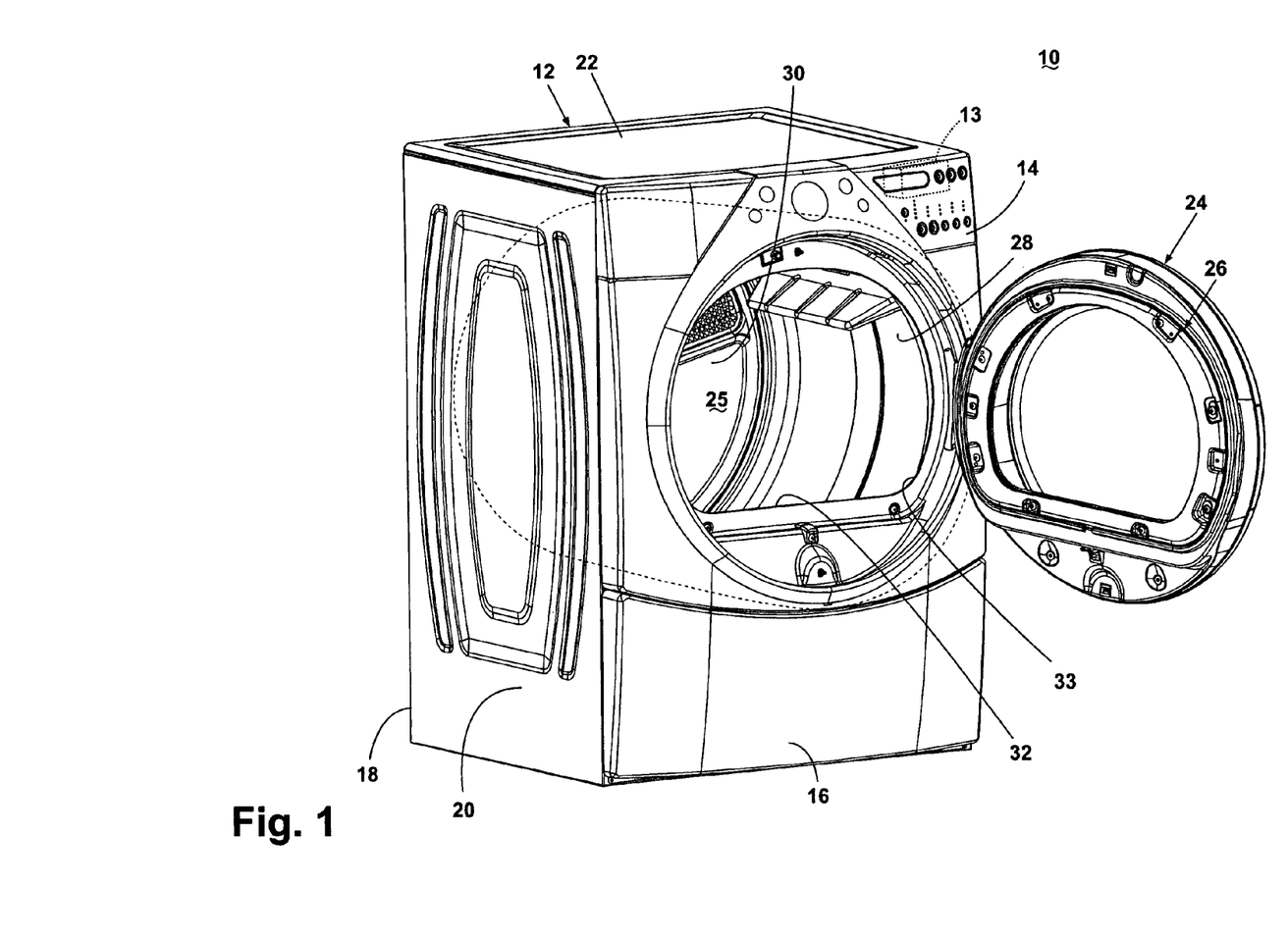
FIG. 1 is a front perspective view of a clothes dryer illustrating a suitable environment for use of an air flow tester according to one embodiment of the invention and for carrying out a method according to an embodiment of the invention.

Referring now to the figures, FIG. 1 illustrates an exemplary clothes dryer 10 defining a suitable environment for the apparatus and method according to one embodiment of the invention. Although the clothes dryer 10 is shown as a front loading dryer, the embodiments of the invention described herein may be used with any suitable dryer and the embodiments are not limited to a particular type of dryer The dryer 10 illustrated in FIG. 1 has a cabinet 12 on which is provided a controller 13 having a user interface 14 for providing a user with an input/output interface with the controller 13 for use in controlling the operation of the dryer 10. The cabinet 12 may be defined by a front wall 16, a rear wall 18 and a pair of side walls 20, and a top wall 22. A door 24 may be hingedly mounted to the front wall 16 and may be selectively moved between opened and closed positions to provide access to a drying chamber 25. The drying chamber 25 may be collectively defined by a rotatable drum 28 that is disposed within the cabinet 12 between opposing rear and front bulkheads 30 and 32. A sealing gasket 26 may be mounted on the interior of the door 24 to press against an opening 33 in the front wall 16 when closed. The sealing gasket 26 may alternatively be located on the front wall 16.

Figure 2:
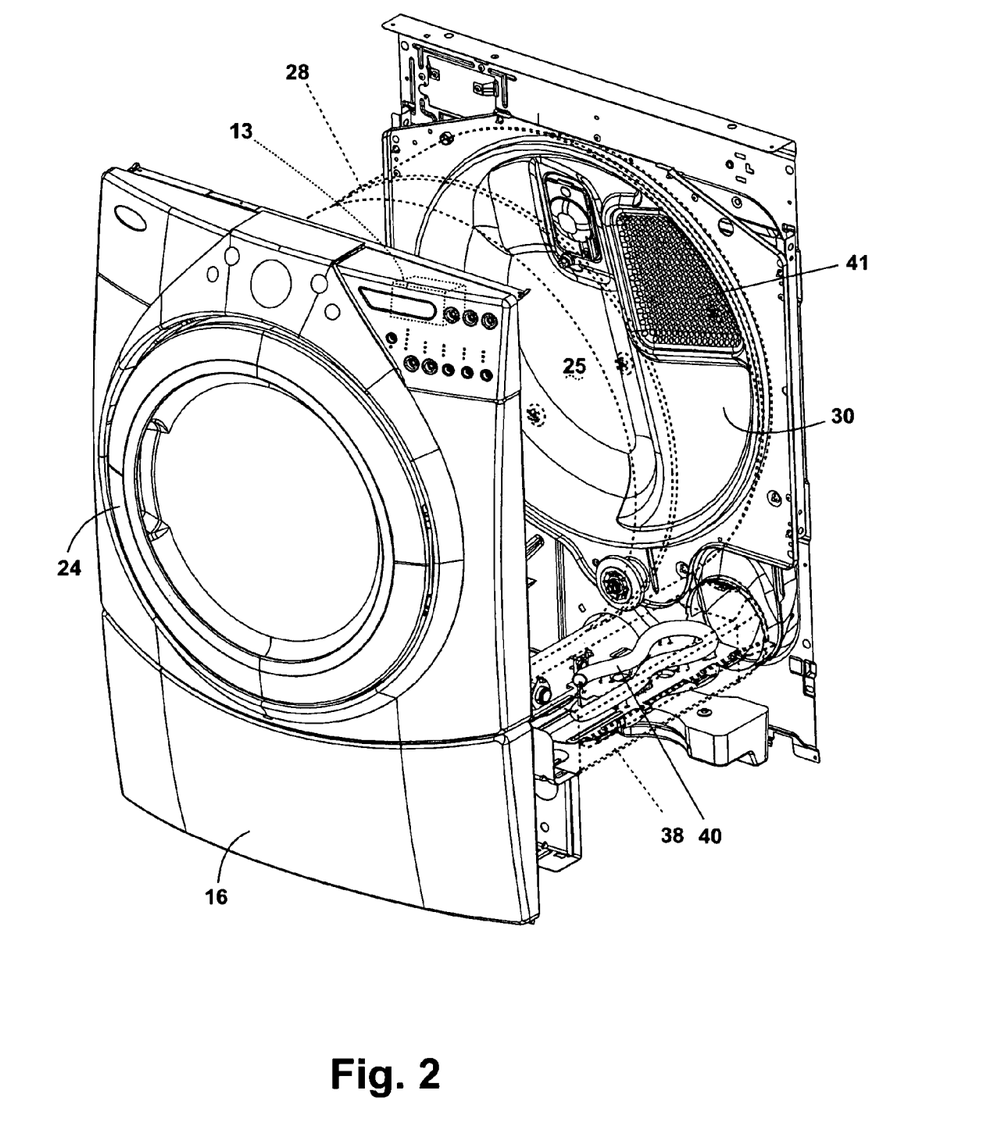
FIG. 2 is a partial perspective view of the dryer of FIG. 1 with portions of the cabinet removed for clarity according to one embodiment of the invention.

Referring now to FIG. 2, an air flow system for the dryer 10 according to one embodiment of the invention will now be described. The air flow system supplies air to the drying chamber 25 and then exhausts the supplied air to the exterior of dryer 10. The supplied air may be heated or not. As seen in FIG. 2, the air flow system may have an air supply portion that is formed in part by an inlet conduit 38, which has one end open to the ambient air and another end fluidly coupled to an inlet grill 41, which is in fluid communication with the drying chamber 25. A heating element 40 lies within the inlet conduit 38 and is operably coupled to and controlled by the controller 13. If the heating element 40 is turned on, the supplied air will be heated prior to entering the drum 28

Figure 3:
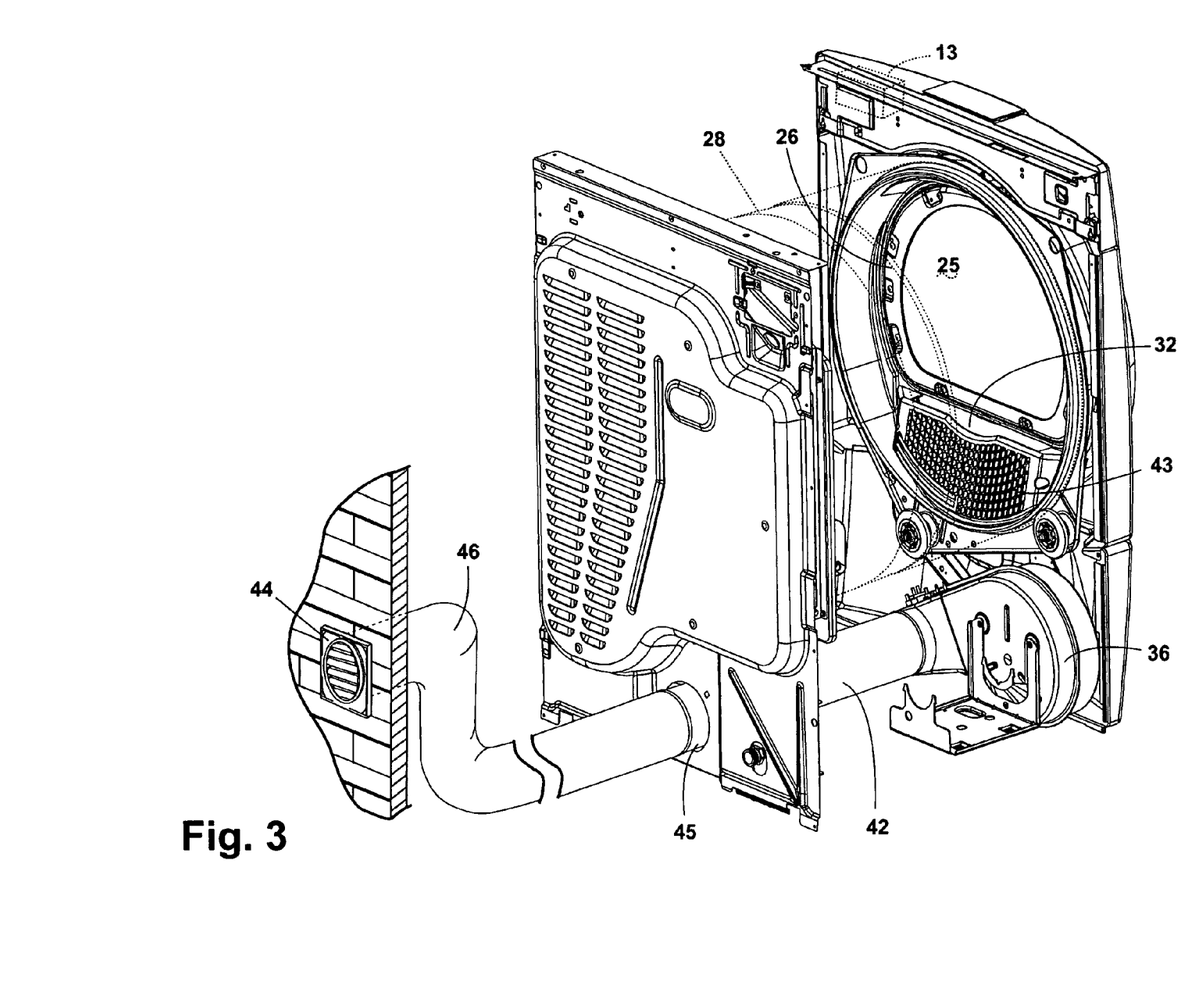
FIG. 3 is second partial perspective view of the dryer of FIG. 1 with portions of the cabinet removed for clarity and showing the clothes dryer coupled to a household exhaust vent system according to one embodiment of the invention.

Referring now to FIG. 3, the air supply system according to one embodiment of the invention further includes an air exhaust portion that is formed in part by an exhaust conduit 42 and lint trap 43, which are fluidly coupled by a blower 36. The blower 36 is operably coupled to and controlled by the controller 13. Operation of the blower 36 draws air into the drying chamber 25 as well as exhausts air from the drying chamber 25 through the exhaust conduit 42.

FIG. 3 also illustrates the fluid coupling of the air supply system for the dryer 10 to a household exhaust vent 44. As illustrated, a hose 46 fluidly couples an outlet 45 of the exhaust conduit 42 to household exhaust vent 44. Other types of conduits may be used in place of the hose 46. The hose 46 may be thought of as part of the household exhaust vent 44 for purposes of this application. They may be collectively thought of as a household exhaust vent system.

Figure 4:
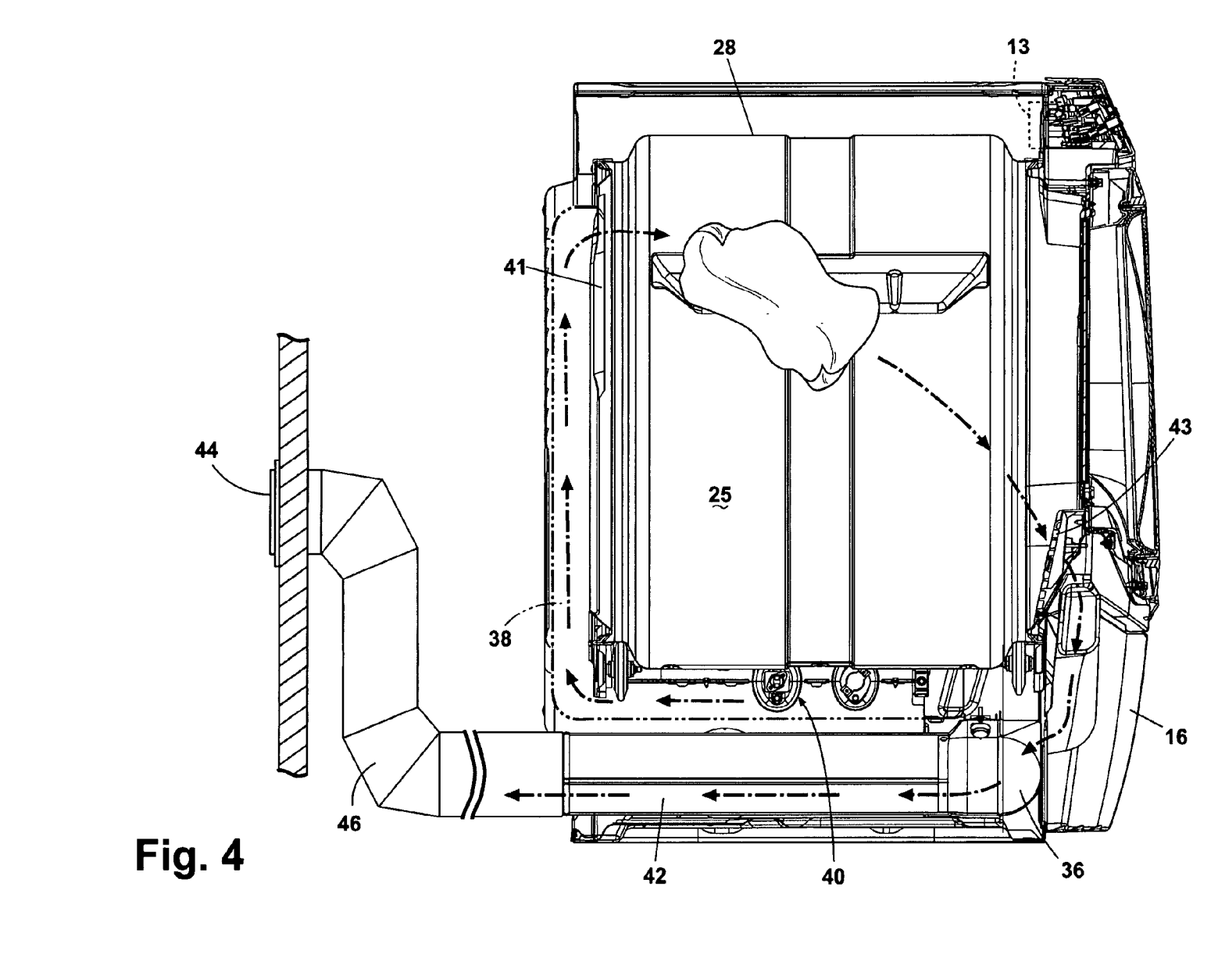
FIG. 4 is a partial side sectional view of the dryer of FIG. 1 showing the flow of air through the dryer of FIG. 1 and the household exhaust vent system according to one embodiment of the invention.

FIG. 4 illustrates the entire air flow through the dryer 10 and household exhaust vent 44 according to one embodiment of the invention. The arrows in FIG. 4 illustrate the flow of air through the dryer 10. The blower 36 draws air into the inlet conduit 38 and over the heating element 40, which may selectively be turned on by the controller 13 to heat the air flowing through the conduit 38. The air flows along the conduit 38 through the rear of the dryer 10 and enters drum 28 through the inlet grill 41. Air flows through the drying chamber 25 and into the lint trap 43, where it is drawn into the blower 36. The blower 36 then blows the air out the exhaust conduit 42 and into the hose 46, where it is exhausted through the exhaust vent 44. A restriction, which includes a partial or complete blockage, in the air flow at any point along the entire air flow path can lead to poor air flow, resulting in decreased drying performance.

Figure 5:
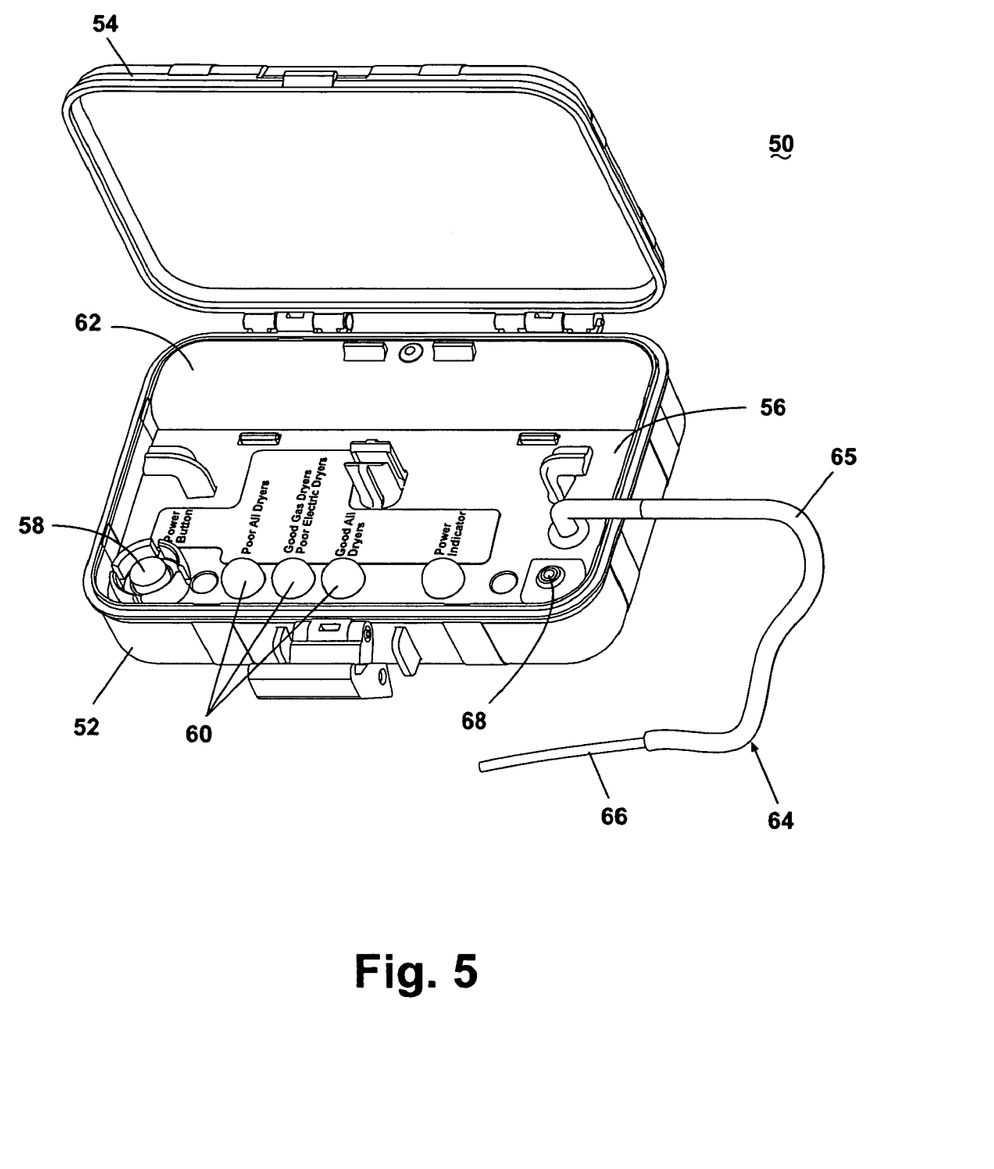
FIG. 5 is a perspective view of one embodiment of an air flow tester according to the one embodiment of the invention, with a cover shown in an open position.

Referring now to FIG. 5, an air flow tester 50 according to one embodiment of the invention is shown and may be used in a method according to the invention for testing the air flow through the dryer 10 and out the exhaust vent 44. The tester 50 may have a housing 52 to which is moveably mounted a lid 54, which may be moved between opened and closed positions. The lid 54 is illustrated in the opened position. The tester 50 may be made without a lid 54, or with a variety of other types of covers, doors, etc.

Provided in the housing 52 is a control panel 56 that may have a power button 58, which may be selectively pressed to turn the tester 50 ON or OFF. Indicators 60 communicate information, including the results of an air flow test, to the user. The indicators 60 are illustrated as visual indicators, such as lights. While visual indicators are illustrated, the tester 50 may also use other indicators, such as audible or tactile indicators, to communicate information to the user. In addition, the visual indicators 60 need not merely be lights, but could also be a LED, LCD, OLED, type display, a gage with a pointer, or a variety of other types of visual indication.

A battery supply 62 is provided to receive a battery or similar electrical supply. The battery supply 62 may be the only source of electrical supply or it may be just one electrical supply, or it may be omitted altogether. For example, the tester 50 may be provided with a suitable transformer, which may be coupled to a household electrical supply by a cord. In this manner, it is possible for the tester 50 to rely solely on an external electrical supply, such as a typical household electrical supply. The type of electrical supply is not germane to the tester 50.

A probe 64 may extend from the control panel 56. As illustrated, the probe 64 is a hollow tube that has a first tube portion 65 with a second tube portion or end piece 66 made from a crush resistant material. The crush resistant end piece 66 may be made from a polymer or copolymer from the family of fluoropolymers that includes but is not limited to fluorinated ethylene propylene (FEP), polytetrafluoroethylene (PTFE) and perfluoroalkoxy (PFA). The interior (ID) and outer (OD) diameters of the crush resistant end piece 66 may be 0.063 inches and 0.125 inches, respectively, although other diameters may also be used. The first tube portion 65 may be made from a silicone-based material such as that used in Tygon® tubing. The ID and OD for the first tube portion 65 may be 0.094 and 0.188 inches, respectively, although other diameters may also be used. The probe 64 and its various elements may be of any length desired or as needed to effect a proper testing of the air flow. For example, the crush resistant end piece 66 may be long enough such that it may extend through the opening 33 and into the drying chamber 25. The total length of the probe 64 may be long enough for the user of the tester 50 to effect the operation of the dryer 10 while conducting a test of the air flow. A crush resistant end piece 66 is provided to prevent the end of the probe 64 from being crushed when one end of the probe 64 is located within the drying chamber 25 and the door 24 is closed, which may inhibit the ability of the sensor 72 to sense the pressure within the drying chamber 25. Alternatively, the first tube portion 65 may be omitted in favor of a single piece of crush resistant tubing.

An optional output port 68 may also be provided. The output port 68 may provide an analog or digital output signal, which may contain data related to the testing. For example, the output signal may be real-time information about one or more test parameters, such as current pressure, during the testing or it may be stored information such as: current pressure, maximum pressure, minimum pressure, change in pressure, or time rate of change of pressure. The real-time and stored information may be in the form of individual or averaged values obtained at a specific point or points in time or during a specific period of time. The information may be an actual value for the parameters or a value that may be used to determine the parameter or indicative of the parameter. It is contemplated that the output signal may be of the type that may be received by a voltmeter and the corresponding voltage may be indicative of or used to determine a pressure characteristic. The output port 68 may be sized to receive a standard input to a voltmeter.

Figure 6:
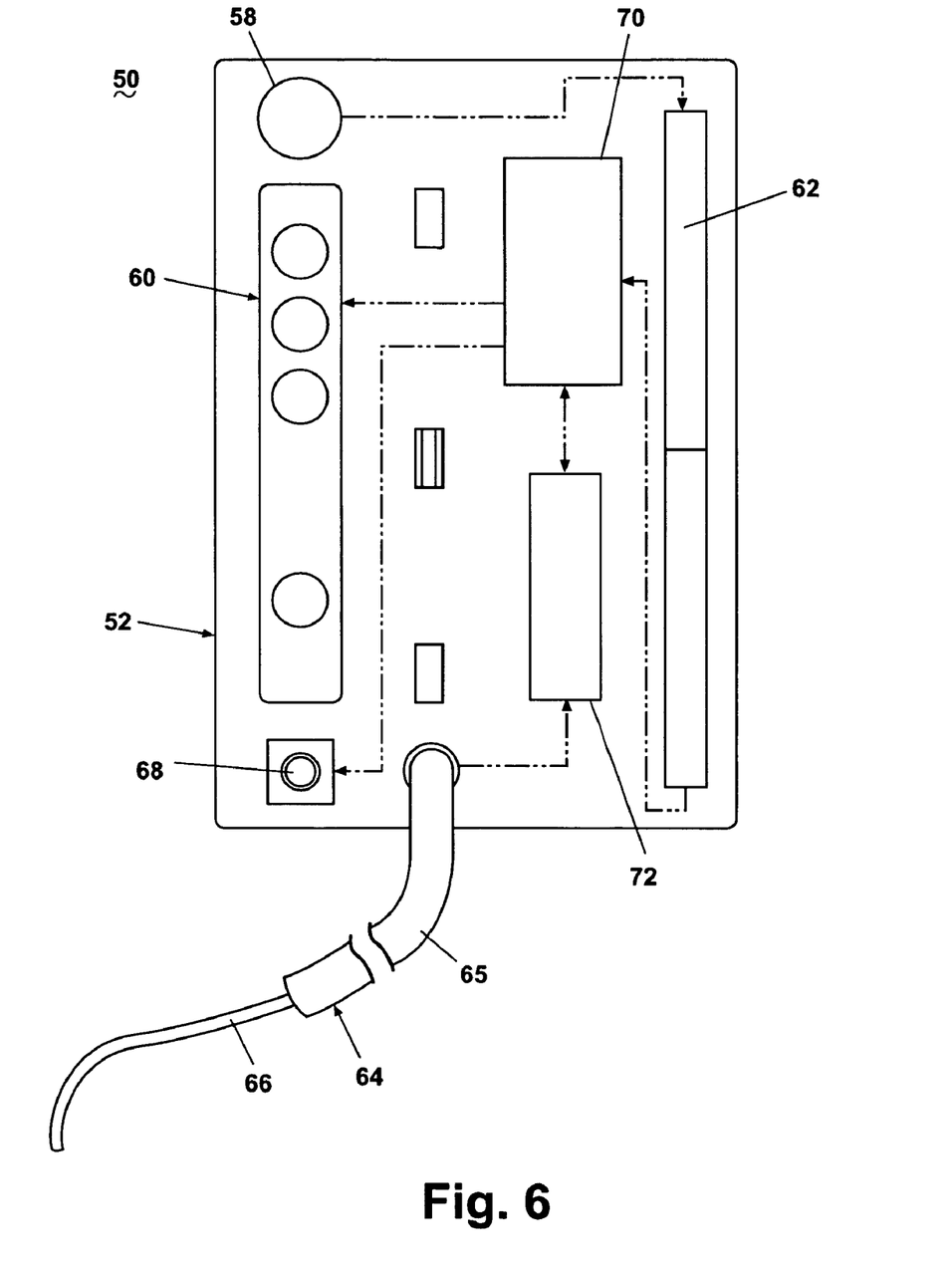
FIG. 6 is a schematic view of the air flow tester of FIG. 5 according to one embodiment of the invention.

FIG. 6 is a schematic view of the tester 50 according to one embodiment of the invention. The tester 50 comprises a controller 70, which may be a micro-processor executing a test software. The controller 70 may have internal and/or external memory in which the test software is stored. The controller 70 is operably coupled to the indicators 60 and may selectively activate the indicators 60 as needed to communicate the desired information. The controller 70 may also be coupled to the output port 68 and may send the output signal to the output port 68. A pressure sensor 72 may be operably coupled to the controller 70. More specifically, an output of the pressure sensor 72 is operably coupled to the controller 70 with the probe 64 coupled to the input of the pressure sensor 72.

The pressure sensor 72 may be a transducer that converts the pressure characteristic sensed through the probe 64 into an electrical signal that is sent to the controller 70. The pressure characteristic may be any characteristic of the environment that is indicative of the air pressure in the drying chamber. Illustrative examples of the characteristic include, without limitation: the air pressure, dryer operating air temperature, dryer operating air flow rate. The pressure characteristic may include one or more characteristics. The pressure characteristics may be determined directly or indirectly.

As with all electrical signals described in this application, the electrical signal from the pressure sensor 72 to the controller 70 may be digital or analog, and may directly/indirectly represent the value of the characteristic seen by the end piece 66 of the probe 64.

A suitable transducer is a strain-gauge based transducer that measures the pressure within the drying chamber 25 relative to the ambient air pressure. However, depending on the desired resolution and accuracy, it may be acceptable to use other types of transducers.

The battery supply 62 may be electrically coupled to the controller 70 through the power button 58. The pressing of the power button 58 controls the supply of electrical power to the various components either directly or through the controller 70.

In an alternative embodiment, the tester 50 may have sensors for measuring the temperature and air flow rate. In this embodiment, rather than determining the pressure directly or indirectly through a pressure characteristic, the temperature and the air flow can be measured and displayed directly to the user. The temperature and air pressure may be displayed to the user with an LCD, OLED, or LED type display or a gage with a pointer. The temperature and air pressure measurements may also be stored by the controller 70.

The temperature sensor may be any suitable temperatures sensor such as a thermistor or an infrared thermometer, for example. The air flow sensor may be any suitable air flow sensor such as a positive displacement, a turbine, or a differential pressure flow meter, for example.

Figure 7:
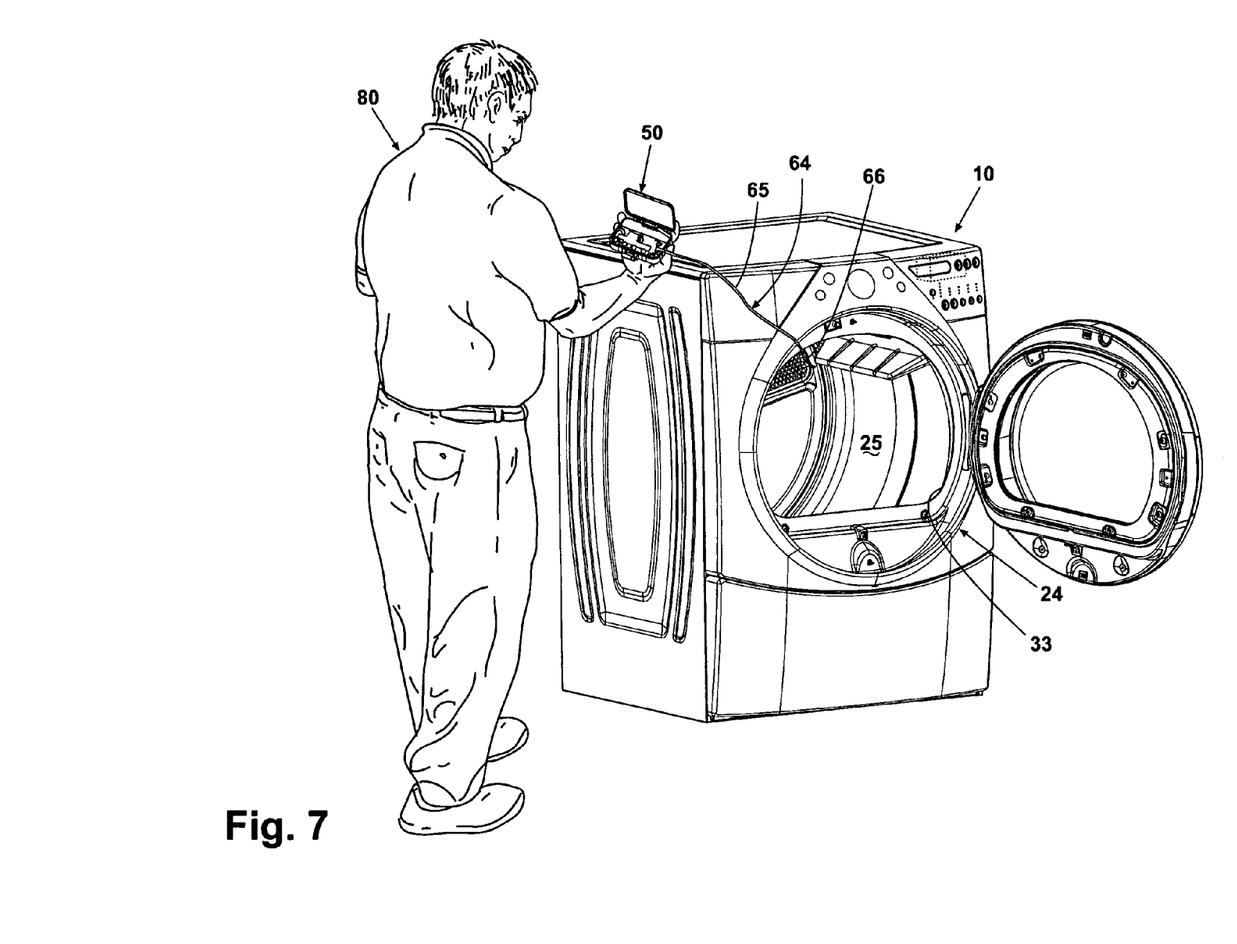
FIGS. 7 and 8 illustrate the use of the air flow tester of FIG. 5 to carry out a method according to another embodiment of the invention.

One method according to one embodiment of the invention will now be described in the context of using the tester 50. Referring now to FIG. 7, the method is based on the anticipated pressure decrease in the drying chamber 25 caused by turning on the air flow system. In most cases, the decrease is relative to a determined reference value. However, in some instances, depending on the desired resolution and accuracy, it may be acceptable to assume a reference value and not determine it. Examples of the reference value are the ambient pressure or the pressure within the drying chamber at the beginning of the test.

The method may begin by a user 80 first assuring that the dryer 10 is empty and that the lint trap 43 is clean. While these assurances are optional, the presence of laundry in the drying chamber 25 or a dirty lint trap 43 will, to some extent, restrict the air flow through the dryer 10, which may lead to less accurate determination of a restriction.

Figure 8:
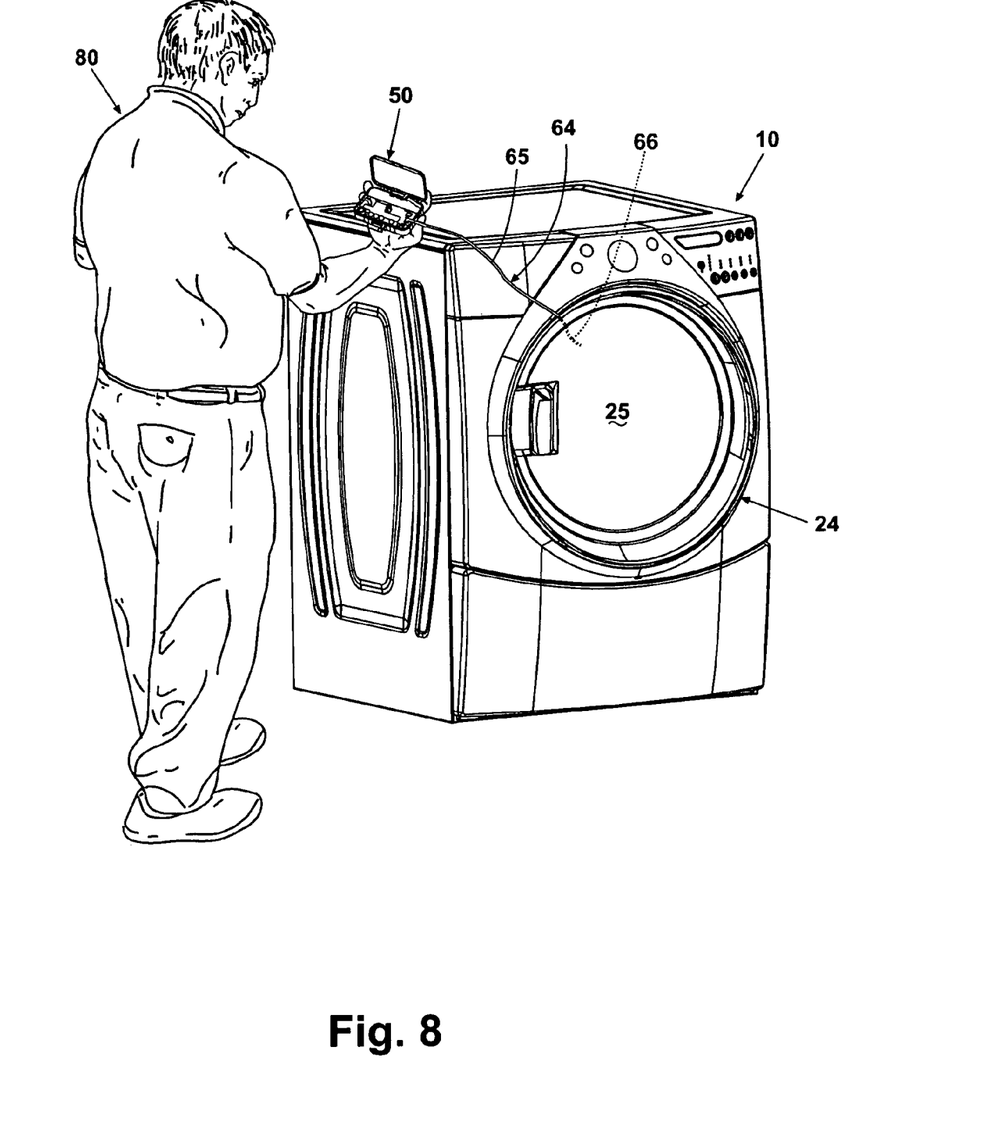

The user 80 may then insert the probe 64 into the drying chamber 25, opening the door 24 if it is closed, such that the crush resistant end piece 66 spans the opening 33 to the drying chamber 25, with a distal end of the end piece 66 residing in the drying chamber 25. Referring to FIG. 8, the user 80 may then close door 24 such that the end piece 66 of the probe 64 is pressed by the seal 26 carried by one of the door 24 and the opening 33 in the front wall 16 of dryer 10. Upon the closing of the door 24, the distal end of the end piece 66 will lie within the drying chamber 25 and be effectively fluidly sealed from the ambient air surrounding the dryer 10. The seal 26 is not completely rigid, but has some flexibility which enables the seal 26 to form a seal around the crush resistant end piece 66 with the dryer door 24, maintaining the separation of the atmosphere within the drying chamber 25 from the ambient air surrounding the dryer 10. The rigidity of the crush resistant end piece 66 prevents the crush resistant end piece 66 from being crushed by the pressure of the seal 26. At this time, given that the door 24 was just closed and the dryer 10 has not yet been started, the pressure in the drying chamber 25 should be the same as that of the ambient air surrounding the dryer 10.

The user 80 may then engage the power button 58 of the test device to power up the tester 50. After the tester 50 is powered up, the tester 50 may automatically make a pressure determination and use it as a reference value. The pressure determination is made by the pressure sensor 72 sensing a characteristic of the pressure in the drying chamber 25 as seen by the end piece 66 of the probe 64. The determination of the characteristic may be sent in the form of an electrical signal from the pressure sensor 72 to the controller 70. As the dryer 10 is not yet being operated, the end piece 66 of the probe 64 would be seeing the pressure in the drying chamber 25, which at this time should be the same as that of the ambient air.

While the method is described as being initiated by the powering on of the tester 50, the method need not be linked to the powering on of the tester 50. The tester 50 may include a "start" button or other similar element to begin the method.

After determining the reference value, the tester 50 may indicate to the user 80 that it is ready to take a reading through the indicators 60 by indicating to the user 80 to turn on the air flow system of the dryer 10. The user 80 then turns on the air flow system for the dryer 10. It is currently contemplated that the user 80 may do this by executing an Air Dry cycle or some other no-heat cycle. However, other methods may also be used to affect the flow of air through the drying chamber 25.

A cycle that heats the air entering the drying chamber 25 may be used, but the addition of heat may result in a pressure increase. If the added heat is sufficient to lead to an erroneous determination of the pressure, then it may be necessary to account for the added heat. The probe 64 may be connected with a temperature sensor in addition to the pressure sensor to measure both the pressure and the temperature. In this case, the tester 50 acquires both a pressure and a temperature reference value.

The temperature measurement may be used by a software program within the controller 70 to compensate for the effects of increased temperature in the dryer 10 compared to the temperature of the air when the reference pressure was taken. The software program may use the data to calculate an adjusted pressure reading or may consult a table of predetermined pressure-temperature relationship values. The temperature-compensated pressure value may be calculated each time the tester 50 is used or the temperature compensation may be initiated only when the temperature sensor detects a temperature above a predetermined threshold value within the drying chamber 25 or when the difference between the reference temperature and the test temperature exceeds a predetermined threshold.

Upon the starting of the Air Dry cycle, air will begin to flow through the dryer 10, which should cause a drop in pressure in the drying chamber 25 by a known amount relative to the reference value if there are no restrictions in the air flow system. To the extent the relative pressure drop is different than what is expected, it may be indicative of a restriction in either the air flow system or in the household exhaust vent system.

The pressure sensor 72 will sense the pressure characteristic seen by the end piece 66 of the probe 64 and communicate the information via electrical signal to the controller 70. The controller 70 will determine a new pressure characteristic for the drying chamber 25 corresponding to the pressure when the air flow system is on. The controller 70 may then compare the new pressure characteristic to the reference value and determine if the different values are indicative of a restriction, which may be used to indicate the condition of the air flow, such as a qualitative condition, examples of which include acceptable or unacceptable. The comparison may be done by the controller 70 determining the difference between the values and comparing that difference to a reference difference. The reference difference may be indicative of an acceptable pressure as compared to an ideal difference.

In most cases the controller 70 will not be comparing actual pressure values, but will be comparing values that correspond to or are indicative of the pressure values. For example, the output signal from the pressure sensor 72 to the controller 70 is normally a voltage, the magnitude of which may correspond to the sensed pressure characteristic.

The comparison may be delayed for better accuracy. For example, when the air flow system is started by the user 80 pressing the Air Dry cycle button, it normally takes some time for the air flow through the drying chamber 25 to reach a steady state for a variety of reasons, including the blower 36 coming up to speed. Therefore, the sensing of the pressure with the air flow system on may be delayed until it is reasonably assured that the air flow through the drying chamber 25 has reached a steady state.

Multiple determinations of the pressure characteristic in the drying chamber 25 with the air flow system on may be made. In some instances, the change in the pressure characteristic of the drying chamber 25 may be useful to know. For example, the multiple pressure determinations may be useful in determining when the air flow system has reached a steady state. Once a steady state is determined, then the current pressure characteristic may be determined. It may also be useful to determine an average of the pressure characteristic with the air flow system ON if the air flow system is subject to temporary variation, such as which may be caused by variation in the electrical supply to the blower 36 or windy conditions acting on the exhaust vent 44 that may cause a varying backpressure.

Regardless of how the determination of the pressure characteristic is made for the drying chamber 25 with the air flow system ON, the determination may be used by the controller 70 to determine if there is a restriction in the air flow system of the dryer 10 or in the household exhaust vent system, e.g., the pressure drop is less than expected when the dryer air flow is turned on.

The final determination of air flow condition, in this case a restriction, may be communicated to the user 80 by the controller 70 activating one of the indicators 60. For example, it is contemplated that the indicators 60 may include a red, yellow, and green indicator, with the red indicating that the restriction is sufficient that the air flow condition is unacceptable and warrants not operating the dryer; the yellow indicator indicating a restriction exists but that the air flow condition is acceptable and the dryer may be used with decreased performance, and the green indicator indicating no material restrictions and the air flow condition is acceptable. Again, any of a variety of other audio or visual indications may be used to convey this data to the user 80. Alternatively, the user 80 may acquire the data from the air flow quality test through the access port 68 using a voltmeter or other suitable device.

If the tester 50 indicates that there is no restriction, then the testing is completed and the probe 64 is removed from the drying chamber 25 and turned off by pressing the power button 58. If the tester 50 indicates that there is a restriction, then the user 80 may uncouple the hose 46 from the exhaust conduit 42 and repeat the test to determine if the blockage is in the air flow system for the dryer 10 or is in the household exhaust vent system.

The uncoupling of the hose 46 from the exhaust conduit 42 fluidly disconnects the air flow system from the household exhaust vent system. If an air flow test is run again, the test will then only be testing the air flow system of the dryer 10. If the tester 50 once again indicates a restriction, then it is known that a restriction exists at least in the air flow system. If the air flow test indicates no restriction, then the air flow system is clear of restrictions and the restriction must be located within the household exhaust vent system.

It is possible to test the air flow system of the dryer 10 prior to connecting it to the household exhaust vent system and then testing the air flow system when it is coupled to the household exhaust vent system. In this way, the tester 50 may be used to test the air flow system prior to delivery of the dryer 10 to the household.

The method may also be used with the alternative embodiment of the tester 50 wherein the tester 50 has sensors for measuring the temperature and airflow rate. According to this embodiment, when the tester 50 is powered up by engagement of the power button 58, the tester 50 may automatically make a temperature and airflow determination and use them as a reference value prior to initiating a drying cycle. Alternatively, the user may initiate a drying cycle, with or without heat, and make a temperature and airflow determination without determining a reference value. The temperature and airflow determinations may be communicated directly to the user or may be sent in the form of an electrical signal to the controller 70. The user may determine the quality of the temperature and the airflow based on the test measurement alone or relative to the reference value by consulting a chart or table of predetermined acceptable and unacceptable values for a given drying cycle. Alternatively, the controller 70 may perform this operation using stored predetermined values and communicate the quality of the temperature and airflow to the user.

While the invention has been described in connection with certain specific embodiments thereof, it may be understood that this is by way of illustration and not of limitation and the scope of the appended claims should be construed as broadly as the prior art will permit.

What is claimed is:

1. A method for testing the air flow in a clothes dryer having a drying chamber having an access opening that is selectively closed by a door and an air flow system for flowing air through the drying chamber, the method comprising:
    inserting a probe of a pressure sensor through the access opening such that a portion of the probe lies within the drying chamber and another portion of the probe lies exteriorly of the clothes dryer;
    closing the door to seal the access opening while the probe extends through the access opening;
    activating the air flow system of the dryer;
    determining a pressure characteristic within the drying chamber based on the pressure characteristic seen by the portion of the probe within the drying chamber; and
    determining a value indicative of the air flow by comparing the determined pressure characteristic to a reference value.

2. The method according to claim 1 wherein the inserting of the probe comprises inserting a crush resistant tube.

3. The method according to claim 1 wherein the closing of the door comprises pressing a seal carried by one of the door and access opening against the probe.

4. The method according to claim 1 wherein determining the pressure characteristic comprises determining a change in pressure in response to flowing air through the drying chamber.

5. The method according to claim 4 wherein the determining the change in pressure comprises comparing the pressure seen by the probe to an ambient pressure of the clothes dryer.

6. The method according to claim 1, further comprising outputting the determined pressure characteristic.

7. The method according to claim 6, wherein the outputting comprises outputting the pressure characteristic in real time.

8. A method for testing the air flow in a clothes dryer having a drying chamber having an access opening that is selectively closed by a door and an air flow system for flowing air through the drying chamber, the method comprising:
    inserting a probe from a handheld device through the access opening such that a portion of the probe lies within the drying chamber and another portion of the probe lies exteriorly of the clothes dryer;
    closing the door to seal the access opening while the probe extends through the access opening;
    turning on the air flow system to flow air through the drying chamber;
    determining a value indicative of the airflow; and
    providing on the handheld device at least one of an audio and visual display indicative of airflow quality as a function of the determined value.

9. The method according to claim 8 wherein the providing a display indicative of the airflow comprises indicating a passing or failing of the air flow.

10. The method according to claim 8 wherein the providing a display indicative of the airflow comprises activating a first indicator indicating the passing of the air flow and the failing of the air flow comprises activating a second indicator different from the first indicator.

11. The method according to claim 8 wherein the providing a display indicative of the airflow comprises one of an LED, OLED and LCD type screen and a gage with a needle.

12. The method according to claim 8 wherein the providing a display indicative of the air flow quality comprises outputting a value of the determined air flow.

13. The method according to claim 12 wherein the providing a display indicative of the air flow comprises outputting the value of the determined air flow in real time.

14. An air flow tester comprising:
    a pressure sensor configured to output a signal indicative of a pressure characteristic;

a probe coupled to the pressure sensor and having a crush resistant portion; and a processor coupled to the pressure sensor to receive the signal and configured to determine an air flow condition based on the signal; and an indicator coupled to the processor wherein the processor is configured to control the indicator to indicate the determined air flow condition.

15. The air flow tester according to claim 14 wherein the indicator comprises at least one light for indicating the air flow condition.

16. The air flow tester according to claim 15 wherein the indicator is configured to indicate a quality of the air flow.

17. The air flow tester according to claim 16 wherein in the quality is one of acceptable or unacceptable.

18. The air flow tester according to claim 14 wherein the indicator comprises an analog display.

19. The air flow tester according to claim 14 further comprising an output port coupled to the processor and the processor is configured to send a signal to the output port indicative of at least one of the signal from the pressure sensor and the determined air flow condition.

20. The air flow tester according to claim 19 wherein the processor is configured to supply the signal to the output port is one of a real-time signal and a single value.

* * * * *